No. 681,225. Patented Aug. 27, 1901.
J. H. JANSSEN.
GEARING FOR WELL DRILLING APPARATUS.
(Application filed Jan. 8, 1900.)
(No Model.)
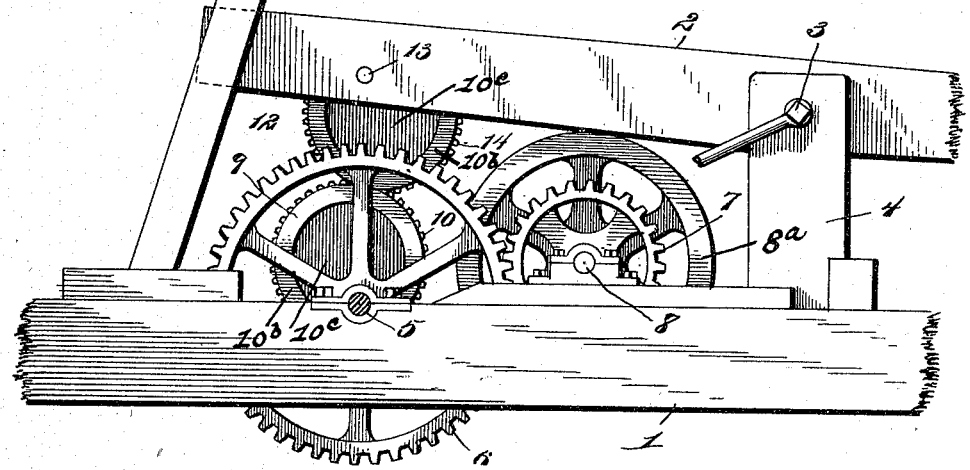
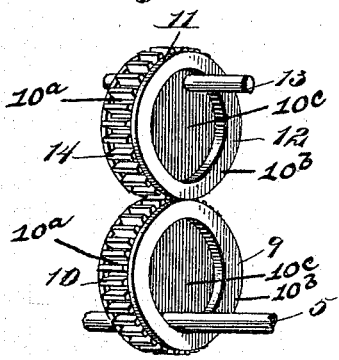
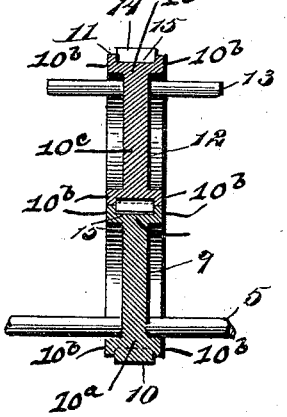
WITNESSES
Louis D. Heinrichs
Harry S. Rohner
INVENTOR
John H. Janssen
By Victor J. Evans.
Attorney

UNITED STATES PATENT OFFICE.

JOHN H. JANSSEN, OF WOONSOCKET, SOUTH DAKOTA.

GEARING FOR WELL-DRILLING APPARATUS.

SPECIFICATION forming part of Letters Patent No. 681,225, dated August 27, 1901.

Application filed January 8, 1900. Serial No. 736. (No model.)

*To all whom it may concern:*

Be it known that I, JOHN H. JANSSEN, a citizen of the United States, residing at Woonsocket, in the county of Sanborn and State of South Dakota, have invented certain new and useful Improvements in Gearing for Well-Drilling Apparatus, of which the following is a specification.

My invention relates to well-drilling apparatus, and more particularly to improved gearing for reciprocating the walking-beam of a well-drilling apparatus whereby a comparatively noiseless operation of the walking-beam is secured.

The invention consists in the combination, with a walking-beam, of two toothed eccentrically-mounted coöperating combined friction and positive gear cylindrical rollers, one of which is carried by the walking-beam and the other by a revoluble driving-shaft below the walking-beam.

The invention further consists in the details of construction of said combined friction and positive gear rollers whereby they mesh with each other without jar and operate to raise and lower the walking-beam without unnecessary noise or friction.

The characteristic features of the invention will be fully described hereinafter and defined in the appended claim, in connection with the accompanying drawings, which form a part of this specification, and in which—

Figure 1 is a side elevation of a portion of a well-drilling apparatus provided with my improvements. Fig. 2 is a view in perspective of the two coöperating eccentric combined friction and positive gear rollers detached from their supports, and Fig. 3 is a vertical section.

The reference-numeral 1 designates the frame of a drilling apparatus, and 2 the walking-beam thereof, pivotally supported upon a pin 3 between the standards 4, rising from the frame.

5 designates a driving-shaft supported in bearings of the frame below the rear end of the walking-beam, and upon this shaft is mounted a large gear-wheel 6, meshing with a pinion 7, fixed upon a driven shaft 8, carrying the balance-wheel $8^a$. Upon the driving-shaft 5, on the inner side of the gear-wheel 6, is eccentrically keyed a combined friction and positive gear roller 9, formed on the center of its periphery with a row of gear-teeth 10 on the projecting rim $10^a$, having offset flanges $10^b$, surrounding a central plain disk or web $10^c$. The peripheral surface of the combined friction and positive gear roller 9 on either side of the central row of teeth is smooth or plain to adapt it to coact with similar plain surfaces 11 on a combined friction and positive gear roller 12, eccentrically mounted upon a pin 13, having bearing in the walking-beam. The combined friction and positive gear roller 12 is also formed with a central row of gear-teeth 14, adapted to mesh with the teeth of the combined friction and positive gear roller 9. The roller 12 is of similar construction to the roller 9, and the pin and shaft on which they are respectively mounted pass through the central plain disks or webs close to the rim.

In order to permit the plain surfaces of one of the two combined friction and positive gear rollers to bear upon those of the other combined friction and positive gear roller, the periphery of each of the combined friction and positive gear rollers between the teeth is depressed below the surface of the plain portions of the combined friction and positive gear roller, as shown at 15, to permit the teeth to project therein. The teeth, however, are not of sufficient length to strike the bottoms of these recesses or depressions, and therefore the jar and noise incident to such striking are avoided.

In the operation of the mechanism as thus described the two combined friction and positive gear rollers are always in contact, and it will be apparent from the illustration that when the long sides of the combined friction and positive gear rollers—that is to say, the sides farthest from the eccentric pivotal supports—are together the rear end of the walking-beam will be at its highest point, while when the short sides or those nearest the pivots are together the walking-beam will be at its lowest position. The limit of movement of the walking-beam may be varied by advancing one of the combined friction and positive gear rollers one or more teeth with relation to the other combined friction and positive gear roller.

I claim—

The combination of a base-frame, a pair of standards supported on the base-frame, a pin extending across the standards, a walking-beam mounted on the pin, a driving-shaft mounted in bearings on the base-frame beneath the rear end of the walking-beam, a driven shaft also mounted in bearings on the base-frame between the standards and the driving-shaft, a large gear-wheel mounted on the driving-shaft, a pinion mounted on the driven shaft, a balance-wheel also mounted on the driven shaft, the roller-pin secured to the rear end of the walking-beam over the driving-shaft, and a pair of combined friction and positive gear cylindrical rollers mounted on the driving-shaft and roller-pin respectively and adjustable with relation to each other to adjust the movement of the walking-beam, each of said rollers being formed integral with a plain disk, with a projecting rim mounted close to the driving-shaft and roller-pin respectively, with shouldered flanges having frictional peripheries, and with depressed teeth between the offset flanges.

In testimony whereof I affix my signature in presence of two witnesses.

JOHN H. JANSSEN.

Witnesses:
CONNOR COONEY,
S. J. MITCHELL.